UNITED STATES PATENT OFFICE.

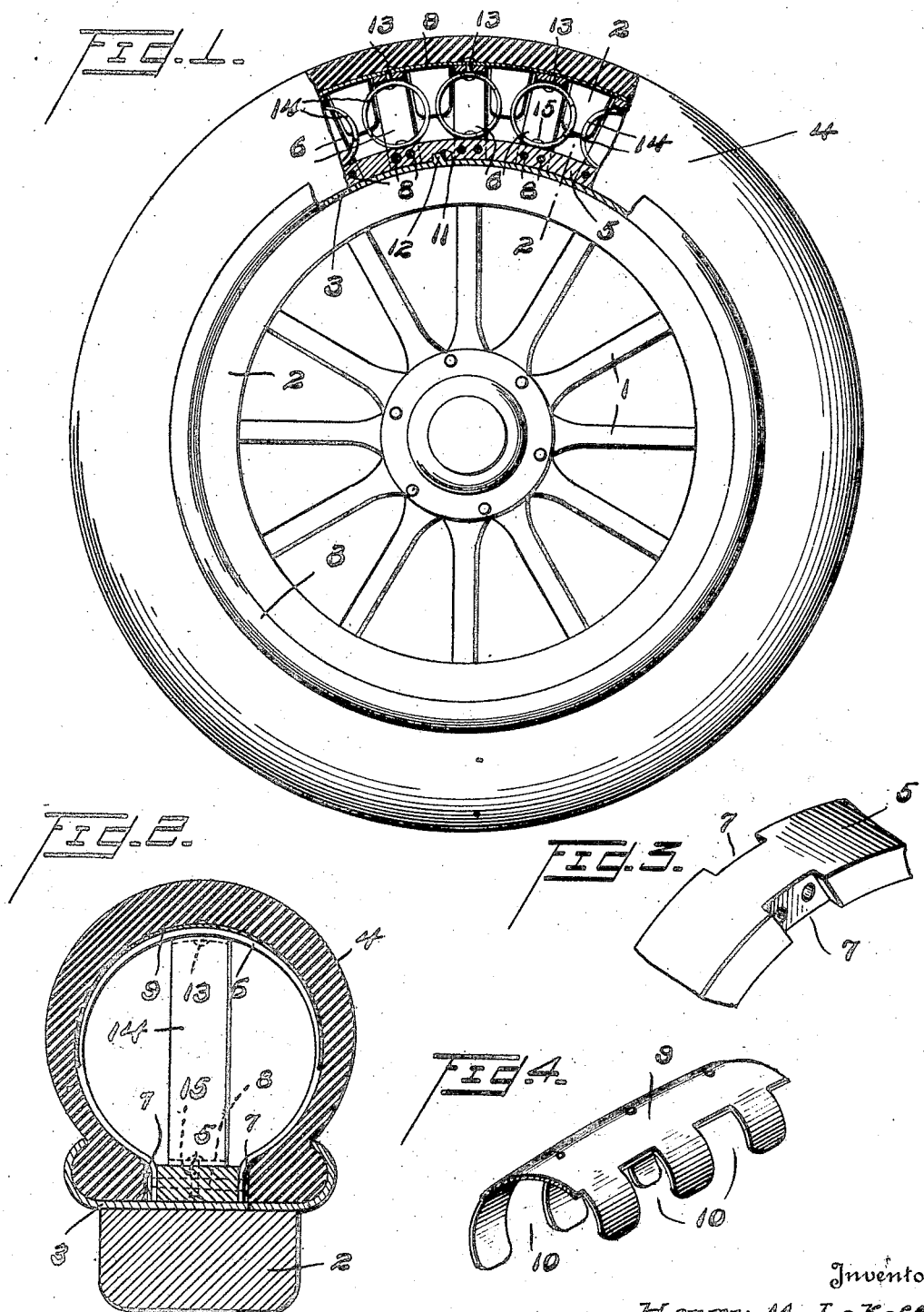

HENRY M. LAKOFF, OF PHILADELPHIA, PENNSYLVANIA.

SPRING-TIRE.

1,101,702.

Specification of Letters Patent.   Patented June 30, 1914.

Application filed October 15, 1913.   Serial No. 795,196.

*To all whom it may concern:*

Be it known that I, HENRY M. LAKOFF, a citizen of the United States, residing at Philadelphia, in the county of Philadelphia and State of Pennsylvania, have invented certain new and useful Improvements in Spring-Tires, of which the following is a specification.

My invention relates to improvements in spring tires, the object of the invention being to provide an improved elastic cushion which may be inserted within the shoe of an ordinary tire and take the place of the inner inflated tube, thus overcoming the expense of blow outs and insuring a resilient tire to absorb shocks and vibrations.

A further object is to provide an improved spring tire of the character stated in which a circular series of bow springs are secured to a ring and connected by an outer ring of sheet metal which bridges the gaps between the springs, yet permits free lateral expansion of the springs to perform their necessary function when the tire is in use.

With these and other objects in view, the invention consists in certain novel features of construction and combinations and arrangements of parts as will be more fully hereinafter described and pointed out in the claims.

In the accompanying drawings: Figure 1 is a view in side elevation partly in longitudinal section illustrating my improvements. Fig. 2 is a view in transverse section on an enlarged scale on the line 2—2 of Fig. 1. Fig. 3 is a fragmentary perspective view of a part of the spring supporting ring, and Fig. 4 is a similar view of the outer metal ring 9.

1 represents an ordinary wheel having the ordinary felly 2 and the ordinary sectional rim 3.

4 is a shoe such as commonly employed with inner inflated tubes, but instead of providing such an inner inflated tube, I employ my improved spring tire which consists of a ring 5 fitting the rim 3 and provided with a circular series of transversely positioned bow springs 6. The ends of the bow springs 6 are secured in recesses 7 in opposite sides of ring 5 by means of transverse rivets 8, and said bow springs are curved or shaped as desired, but preferably to conform to the ordinary shape of tire in general use. Inside of each spring 6, a circular spring 14 located at right angles thereto is provided. The outer ends of the springs 6 and 14 where they cross each other, are secured by rivets 13, and the inner ends of the springs 14 are secured by a rivet 15 to ring 5. The springs 6 and 14, at their outer portions, are connected by a sheet metal ring 9 to which the springs are secured by the rivets 13. This ring 9 is preferably of steel or other spring elastic metal, and is curved transversely to conform to the shape of the springs 6. The side edges of the ring 9 extend around the springs, and are provided with recesses 10 in opposite sides through which recesses, the springs 6 are free to expand transversely of the tire yet the metal ring 9 effectually bridges the gaps between the springs, not only at the outer ends of the springs, but also between the springs at the sides of the tire, so that the ring 9 compels the springs to operate in unison to give to the tire its proper resiliency and strength, and not compel each spring to sustain in turn the entire stresses of the tire. By constructing the ring 9, so that it extends at least half way around the tire and preferably slightly more than half way, as seen in Fig. 2, the shoe is strengthened at its sides, not only at the springs, but at points between the springs as well.

The ring 5 is provided with a recess 11 to receive a lug 12 on rim 3, and prevent any rotary movement of ring 5 on the rim, yet allow the ring 5 with its springs to be readily moved off of the rim when the sectional rim is separated as will be understood.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A spring tire comprising a ring adapted to be positioned around a rim between the sides of a shoe, a circular series of bow springs secured at their ends to opposite sides of the ring and conforming in shape to the shape of the shoe in cross section, an outer ring of sheet metal secured to each of the springs and curved transversely in conformity to the shape of the springs, and said outer ring extending approximately half way around the spring and recessed at opposite sides through which recesses the springs are free to expand, substantially as described.

2. A spring tire comprising a ring adapted to be positioned around a rim between the sides of a shoe, a circular series of bow springs secured at their ends to opposite sides of the ring and conforming in shape to the shape of the shoe in cross section, an outer ring of sheet metal secured to each of the springs and curved transversely in conformity to the shape of the springs, and said outer ring extending approximately half way around the spring and recessed at opposite sides through which recesses the springs are free to expand, said ring at its side portions between the recesses bridging the gaps between the springs and sustaining side pressure of the shoe, substantially as described.

3. A spring tire comprising a ring adapted to be positioned around a rim between the sides of a shoe, a circular series of bow springs secured at their ends to opposite sides of the ring and conforming in shape to the shape of the shoe in cross section, an outer ring of sheet metal secured to each of the springs and curved transversely in conformity to the shape of the springs, and said outer ring extending approximately half way around the spring and recessed at opposite sides through which recesses the springs are free to expand, and a circular series of circular springs located at right angles to the first-mentioned springs and between the first-mentioned springs and the first-mentioned ring and secured to both, substantially as described.

In testimony whereof I have signed my name to this specification in the presence of two subscribing witnesses.

HENRY M. LAKOFF.

Witnesses:
  M. E. DITTUS,
  CHAS. E. POTTS.